US008092678B2

(12) United States Patent
Ott

(10) Patent No.: US 8,092,678 B2
(45) Date of Patent: Jan. 10, 2012

(54) SYSTEMS AND METHODS FOR WASTEWATER TREATMENT

(75) Inventor: Christopher Ott, Napa, CA (US)

(73) Assignee: Protech Services, Inc., Dixon, CA (US)

( * ) Notice: Subject to any disclaimer, the term of this patent is extended or adjusted under 35 U.S.C. 154(b) by 234 days.

(21) Appl. No.: 12/173,751

(22) Filed: Jul. 15, 2008

(65) Prior Publication Data

US 2010/0012580 A1    Jan. 21, 2010

(51) Int. Cl.
*C02F 3/32* (2006.01)
(52) U.S. Cl. .................. 210/602; 210/615; 210/259
(58) Field of Classification Search .............. 210/602, 210/608, 609, 612, 615, 620, 150, 151, 252, 210/259
See application file for complete search history.

(56) References Cited

U.S. PATENT DOCUMENTS

| | | | | |
|---|---|---|---|---|
| 4,267,038 A | * | 5/1981 | Thompson | 210/602 |
| 6,192,833 B1 | * | 2/2001 | Brune et al. | 119/204 |
| 6,635,177 B2 | * | 10/2003 | Oswald et al. | 210/602 |
| 6,692,642 B2 | | 2/2004 | Josse et al. | |
| 7,329,351 B2 | | 2/2008 | Roberts et al. | |
| 2006/0138047 A1 | * | 6/2006 | Morgoun | 210/614 |
| 2007/0114182 A1 | * | 5/2007 | DePoli et al. | 210/703 |

OTHER PUBLICATIONS

International Search Report, PCT/US09/50567, Dated Oct. 23, 2009.
Written Opinion, PCT/US09/50567, Dated Oct. 23, 2009.
Ott, Christopher, Application No. PCT/US2009/50567, International filing date Jul. 14, 2009, International Search Report dated Oct. 23, 2009.
Ott, Christopher, Application No. PCT/US2009/50567, International filing date Jul. 14, 2009, Written Opinion dated Oct. 23, 2009.

* cited by examiner

*Primary Examiner* — Fred Prince
(74) *Attorney, Agent, or Firm* — Ecotech Law Group, P.C.

(57) ABSTRACT

A method of wastewater treatment is described. The method includes: (i) receiving wastewater; (ii) performing a first type of treatment on wastewater to produce wastewater having a first property which is capable of changing; (iii) preventing the first property from changing; (iv) performing a second type of treatment on wastewater; and wherein the first property includes at least one property selected from a group consisting of biochemical oxygen demand ("BOD") level, dissolved oxygen level, solid content and nutrient level.

48 Claims, 4 Drawing Sheets

System Overview (100)

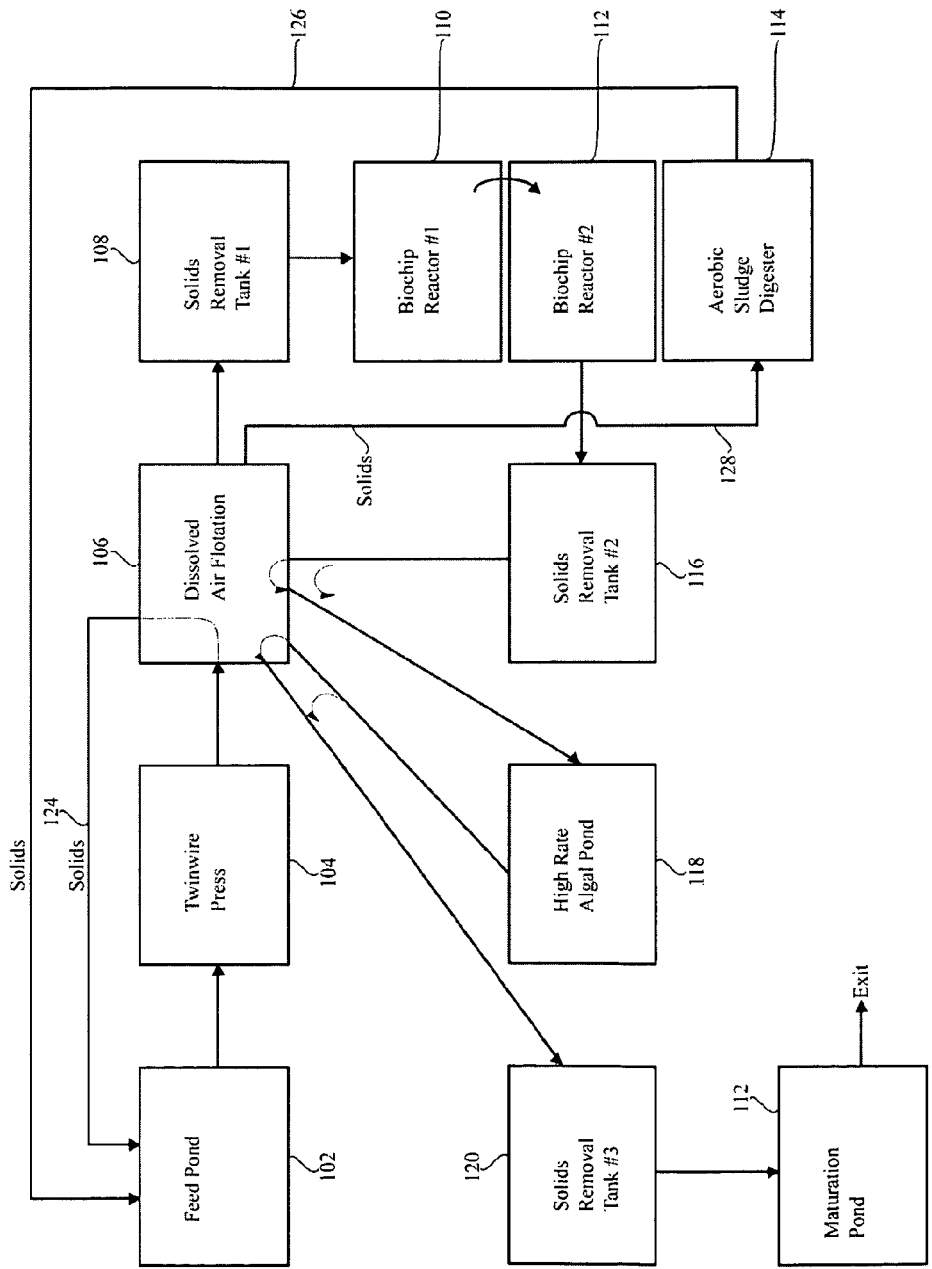
Figure 1: System Overview (100)

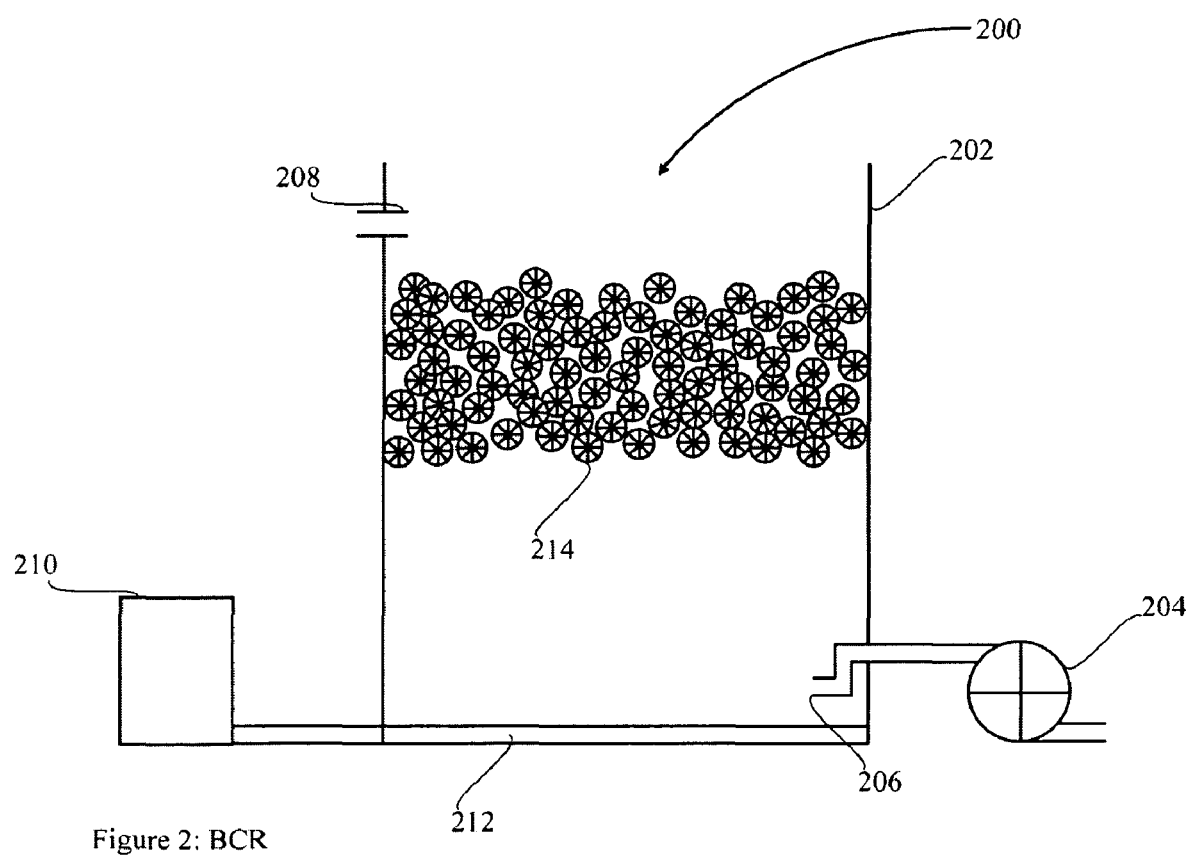
Figure 2: BCR

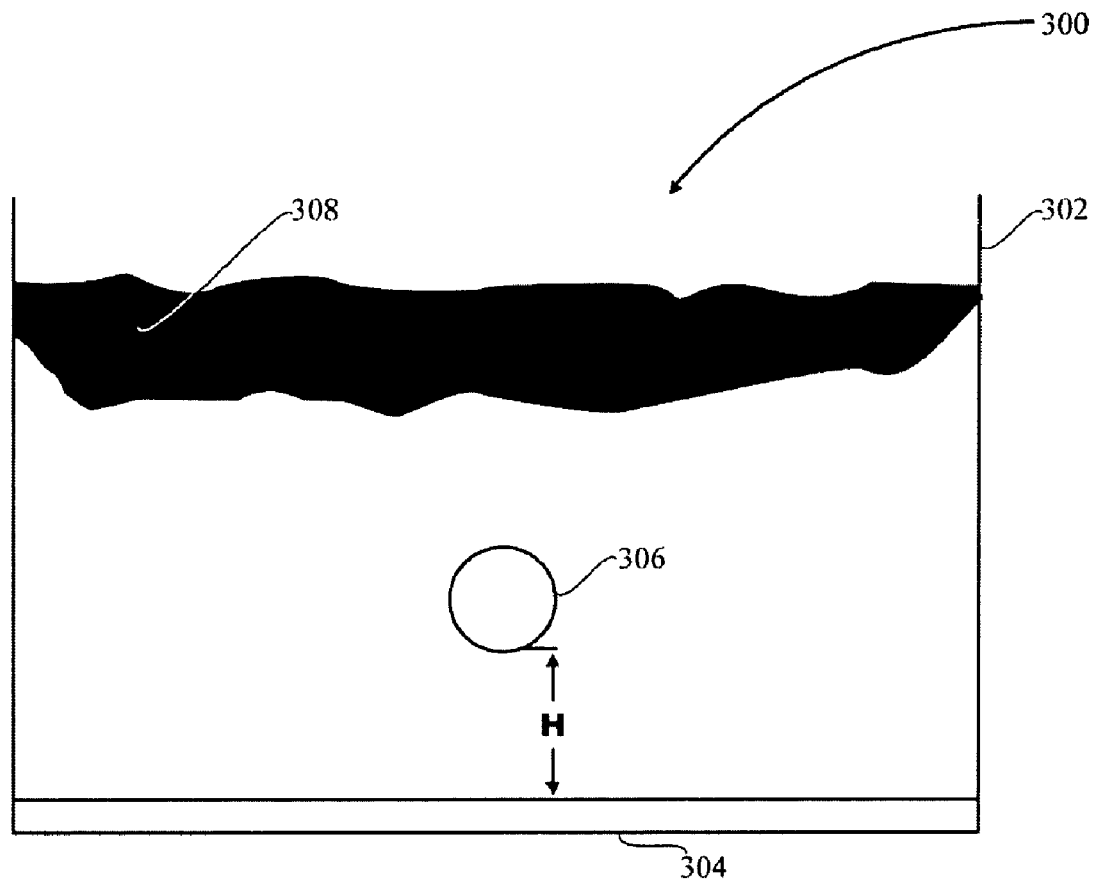
Figure 3: High Rate Algal Pond

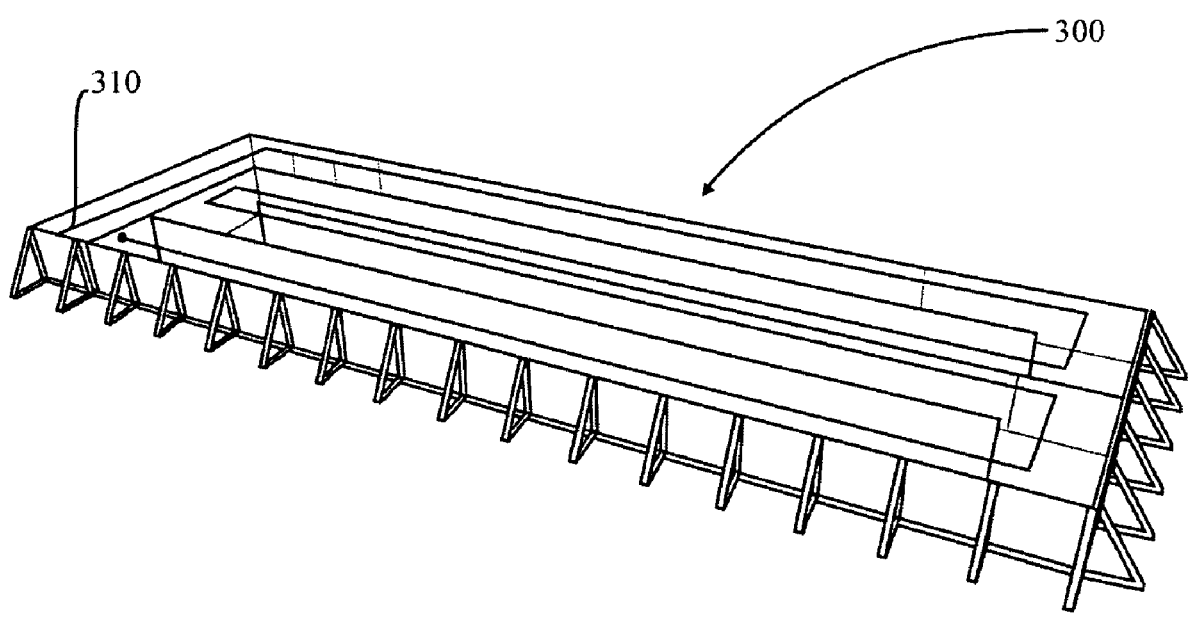
Figure 4: Channel length of HRAP

SYSTEMS AND METHODS FOR WASTEWATER TREATMENT

BACKGROUND OF THE INVENTION

The present invention relates generally to wastewater treatment. More particularly, the present invention relates to active treatment systems and methods, which effectively and rapidly remove contaminants from wastewater.

Conventional wastewater treatment begins with pretreatment of wastewater, which is carried out in different stages. In an initial stage, wastewater undergoes hydrolysis to convert particulate matter to soluble compounds. These soluble compounds are degraded in a next stage. By way of example, fermentation degrades sugars and fatty acids present in wastewater to produce acetate, hydrogen and oxygen. Ultimately the degraded compounds are converted to methane gas by typically using methanogenic organisms.

After pretreatment concludes, certain conventional methods may rely on passive techniques, which rely upon nothing more than gravity, to remove suspended solids from wastewater. Typically, a primary sedimentation vault, large enough to store 30 million gallons of water, is employed to carry out sedimentation. Sedimentation is a slow process where relatively heavy solids in wastewater are allowed to settle, such that they sink to the bottom of the vault, producing a discrete solid phase containing heavy solids and a discrete liquid or water phase. As a result, these type solids easily separate from the liquid phase of wastewater.

After heavy solids are removed, wastewater is transported into another large tank to remove organic matter. In this large tank, microorganisms adhere to the thick walls and bottom layer of the tank and thrive under appropriate light, temperature and surface area in the tank. These microorganisms grow in large enough numbers and consume most of the oxygen and food (i.e., organic matter) present in wastewater. In the absence of conditions necessary to sustain, microorganisms eventually die, leaving behind wastewater that is enriched with nitrogen and phosphorous. Conventional methods discharge this wastewater to the soil, ponds or tanks depending on the amount of other remaining contaminants.

Unfortunately, conventional wastewater treatment suffers from several drawbacks. For example, not only is the reliance on sedimentation for removal of solids a long and drawn out process, but is also very expensive. Specifically, infrastructure, such as a large tank, pipes and pumps, represent significant capital costs.

As another example, the process of removing organic matter, like the process of solid removal, is also passive and expensive as it is carried out over long periods of time in a large tank. As yet another example, conventional treatment methods do not offer provisions for effective removal of dead microorganisms and residual nitrogen and phosphorous from wastewater. Although processes like reverse osmosis or ion exchange are known to remove nitrogen and phosphorous, they are not deemed commercially viable and are, therefore, not integrated into conventional wastewater treatment methods.

What is, therefore, needed are systems and methods of wastewater treatment that more effectively and rapidly treat wastewater.

SUMMARY OF THE INVENTION

In view of the foregoing, this invention provides systems and methods for wastewater treatment that more effectively and rapidly treat wastewater.

Wastewater typically contains, among other constituents, solids including total suspended solids (TSS), inorganic and organic matter, nitrogen, phosphorous and living organisms. Removal of these constituents in a commercially viable manner poses unique challenges, which are not addressed by conventional treatment methods that primarily rely on gravity and time. Against this backdrop, the present invention adopts an active approach to wastewater treatment—i.e., to effectively and rapidly treat wastewater in a commercially viable manner. Specifically, the present invention provides system and methods to effectively and rapidly remove different types of contaminants from wastewater by primarily relying on inventive subsystems and steps, and not merely gravity and time.

The approach adopted by the present invention recognizes, among other things, that the concept of biochemical oxygen demand ("BOD") drives various steps of wastewater treatment. BOD is a well known parameter which indicates the amount of oxygen needed to biologically stabilize the organic matter present. According to preferred embodiments of the present invention, efforts to effectively control BOD levels in various stages of wastewater treatment rely upon more than gravity and time. This allows the present invention to offer active treatment of wastewater, as opposed to prior art's passive treatment, which relies only upon gravity and time.

Organic matter commonly present in wastewater uses oxygen for various reasons and as a result, depletes soluble oxygen. A requisite high level of dissolved oxygen, however, is desirable to grow microorganisms to consume organic matter present in wastewater treatment. Conventional methods only in a single discrete step grow microorganisms by introducing oxygen to replenish the depleted levels of oxygen in wastewater. This step provides oxygen to initially promote growth of naturally occurring microorganisms to large numbers so that they consume almost all of the organic matter and oxygen in wastewater. Conventional methods introduce oxygen by implementing passive means, i.e., require a large space-consuming tank to expose a greater surface area to the atmosphere for long periods of time.

The present invention recognizes the need to maximize use of high pressure air diffusion in multiple steps to actively increase the amount of dissolved oxygen in wastewater as well as creating an active environment for naturally occurring and custom introduced bacteria to grow by increasing the surface area to volume ratio in specific reactors. In preferred embodiments of the present invention, this process of actively introducing oxygen and increasing surface area to volume ratio begins early, during a solids removal stage and well before microorganisms growth is encouraged in conventional methods.

When sufficient amount of microorganisms die in an oxygen and nutrient poor environment. Dead organisms undergo decay, raising levels of ammonia, nitrate and nitrite through a process known as "nitrification." Conventional treatment discharges the wastewater with a high concentration of nitrogen and phosphorous to the environment. Reverse osmosis and ion exchange are known to remove nitrogen and phosphorous, but are not deemed commercially viable and, are therefore, not integrated into conventional wastewater treatment methods.

Discharge of nutrient rich effluent is known to be injurious to life. Nitrates are carcinogenic and direct discharge of wastewater with nitrates can contaminate drinking water aquifers. The present invention recognizes this and prevents such contamination by effectively removing nitrogen and phosphorous from wastewater before discharge.

Preferred embodiments of the present invention effectively treat wastewater by driving down BOD, maintaining the level of dissolved oxygen, lowering the solid content and controlling the nutrient level in wastewater at various stages. By way of example, in one stage, the present invention drives down BOD and solid content in wastewater by actively focusing on the removal of BOD contributing solids.

As another example, during the process of removing solids, the present invention also focuses on improving the growth regime for naturally occurring and genetically engineered bacteria. Preferred embodiments of the present invention use high pressure air diffusion to substantially maintain or increase the level of dissolved oxygen in wastewater. As a result, according to preferred embodiment of the present invention, microorganism growth is encouraged well before they are employed to remove organic mater.

As yet another example, directly after removal of organic matter by microorganism consumption, preferred embodiments treat wastewater by creating anaerobic conditions to achieve complete microorganism die off and lower solid content or reduce BOD in wastewater. Next, the wastewater is treated to remove solids and further reduce BOD in an aerobic environment which replenishes the dissolved oxygen levels.

As yet another example, preferred embodiments of the present invention while actively removing BOD contributing solids, dead microorganisms, nutrients, algae and other solids, maintain the level of dissolved oxygen in wastewater to prevent an increase of BOD and solid content by reverse reaction. It is important to note that prior art fails to recognize drawbacks of reverse reactions which increase BOD, let alone offer provisions to prevent increase of BOD.

As yet another example, preferred embodiments of the present invention, drive down the nutrients in wastewater by actively focusing on the removal of all forms of nitrogen and phosphates by effectively cultivating specific biological processes that utilize nutrients available for their own growth. The invention further reduces the nutrient load by actively removing any biological matter remaining in the effluent.

In one aspect, the present invention provides a process of wastewater treatment. The method of wastewater treatment includes: (i) receiving wastewater; (ii) performing a first type of treatment on wastewater to produce wastewater having a first property which is capable of changing; (iii) preventing the first property from changing; and (iv) performing a second type of treatment on wastewater; and wherein the first property includes at least one property selected from a group consisting of BOD level, dissolved oxygen level, solid content and nutrient level.

The step of receiving preferably includes receiving wastewater in a feed pond that is capable of either increasing or maintaining dissolved oxygen at a substantially constant level. In this embodiment, oxygen is dissolved by using diffused air flow.

In one embodiment of the present invention, the first type of treatment includes removal of solids and the second type of treatment includes removal of organic matter. In this embodiment, removal of solids includes: (i) mechanically separating solids from wastewater to remove a first amount of solids from wastewater; and (ii) flowing dissolved air to remove a second amount of solids from wastewater. The first amount of solids may represent between about 75% and about 98% of solids removed from wastewater, which has a solid content that may be between about 15% and about 30%. The second amount of solids may represent between about 85% and about 95% of solids removed from wastewater, which has a solid content that may be between about 3% and about 6%.

According to one preferred embodiment of the present invention, the step of mechanically separating includes separating solids from wastewater which is obtained directly from a feed pond.

In one embodiment of the present invention, the step of preventing includes removing solids from wastewater in a tank that uses diffused air flow to maintain dissolved oxygen in wastewater at a substantially constant level. Maintaining dissolved oxygen substantially at constant level means that the difference between level of dissolved oxygen in the influent and the effluent stream does not exceed more than about 5%. The step of removing may further include removing solids using screens which separate certain particle sizes from wastewater. The step of removing solids include removing between about 85% and about 90% of solids having particle sizes greater than 20 micrometers from wastewater, which has a solid content of about 1%.

In an alternative embodiment of the present invention, the first type of treatment includes removing organic matter from wastewater and the second type of treatment includes removing nutrients from wastewater. In this embodiment, the step of removing organic matter includes exposing microorganisms in wastewater to oxygen in the presence of biological chips. Microorganisms may be exposed to oxygen in a surface area to volume ratio that is between about 32 square feet per cubic foot and about 130 square feet per cubic foot. The step of removal of nutrients, in this embodiment, includes treating wastewater in an algal pond in the presence of a spectrum of radiation having wavelengths ranging from about $10^2$ nm to about $10^6$ nm. The step of treating wastewater in an algal pond may include aerating wastewater. The algal pond is preferably a high rate algal pond providing a surface area that is between about 1000 square feet and about 50,000 square feet for wastewater treatment. The high rate algal pond may be maintained at a temperature that is between about 70° F. and about 95° F. The high rate algal pond may have a channel length that is between about 200 feet and about 3000 feet.

The step of preventing may include: (i) treating wastewater under anaerobic conditions to produce wastewater with low biochemical oxygen demand ("BOD"); and (ii) treating wastewater with low BOD under aerobic conditions. In preferred embodiments of the present invention, anaerobic conditions are created by removing dead microorganisms from wastewater in a tank that is sealed to maintain dissolved oxygen in wastewater at a substantially constant level. The aerobic conditions preferably include: (i) removing dead microorganisms from wastewater; and (ii) contemporaneously increasing level of dissolved oxygen in wastewater.

In other alternative embodiments of the present invention, the first type of treatment includes removing nutrients from wastewater and the second type of treatment includes exposing wastewater to elements of nature. In this embodiment, the step of preventing further includes: removing algae from wastewater; and contemporaneously increasing level of dissolved oxygen in wastewater. The step of preventing further includes removing algae from wastewater in a tank that includes screens to separate solids from wastewater and introducing air bubbles in wastewater to maintain dissolved oxygen at a substantially constant level.

In another aspect, the present invention provides a system for wastewater treatment. The system includes: (i) means for receiving wastewater; (ii) means for performing a first type of treatment on wastewater to produce wastewater having a first property which is capable of changing; (iii) means for preventing the first property from changing; (iv) means for performing a second type of treatment on wastewater; and wherein said first property includes at least one property selected from a group consisting of BOD level, dissolved oxygen level, solid content and nutrient level.

In yet another aspect, the present invention provides a system for wastewater treatment. The system includes: (i) a tank for removing solids from wastewater; (ii) a first sedimentation removal tank ("SRT") designed to remove solids from wastewater and the first SRT capable of removing solids using a screen and capable of introducing air bubbles to maintain dissolved oxygen in wastewater at substantially constant level when solids are removed from wastewater; and (iii) a reactor containing biological chips and microorganisms to remove organic matter present in water. The tank may be a twin wire press or a feed pond. The system may further include a dissolved air flotation ("DAF") device. DAF preferably includes: (i) a pored diffuser; and (ii) a high pressure water pump fitted with a venturi tube for drawing in air to form air bubbles and forcing air bubbles through the pore diffuser. The reactor may include a blower to facilitate introduction of oxygen into wastewater. The reactor preferably has a surface area of between about 70 square feet and about 210 square feet. The reactor may be a rotating biological contractors or a packed bed reactor.

The system may further include: (i) a second SRT for removing dead microorganisms from wastewater and the second SRT capable of being sealed to maintain dissolved oxygen in wastewater at substantially constant level when dead microorganisms are removed from wastewater; and (ii) an algal pond capable of removing nutrients from wastewater in presence of algae. The system may further still include a dissolved air flotation ("DAF") device that is connected to the second SRT at one end and is connected to the algal pond at another end and the DAF device is capable of increasing level of dissolved oxygen in wastewater when removing dead microorganisms from wastewater. The algal pond preferably operates at a temperature that is between about 65° F. and about 95° F. The algal pond may be equipped with a spectrum radiation source which operates to provide wavelengths in a range from about $10^2$ nm to about $10^6$ nm. The source may be located at a distance that is between about ½ and about ⅓ of a depth of the pond. The algal pond may include a hydraulic pump and a paddle wheel designed for mixing wastewater. The algal pond may be a high rate algal pond.

The system may further still include a third SRT designed to remove algae introduced from the algal pond. In this embodiment, the inventive system further includes a maturation pond being designed to expose wastewater to natural elements of environment before discharging wastewater to environment. The maturation pond is preferably connected to the third SRT. The system preferably includes a feed pond for directly feeding wastewater to the tank. The system may further include a connection between the DAF and the feed to provide residual solids from the DAF to the feed pond. The system may further include a dissolved air flotation device which is connected to the third SRT at one end and connected to the algal pond at another end.

In alternative embodiment of the present invention, the system further still includes an aerobic sludge digester and a connection between said aerobic sludge digester and said DAF to provide residual solids from said DAF to said aerobic sludge digester.

In yet another aspect, the present invention provides a system for wastewater treatment. The system includes: (i) a reactor containing biological chips and microorganisms to remove organic matter from wastewater; (ii) a SRT for removing solids from wastewater and the SRT capable of being sealed to maintain dissolved oxygen in wastewater at substantially constant level when solids are removed from wastewater; and (iii) an algal pond containing algae and designed to removing nutrients from wastewater. The system may further include a dissolved air flotation ("DAF") device that is connected to the SRT at one end and connected to the algal pond at another end.

In yet another aspect, the present invention provides a system for wastewater treatment. The system includes: (i) an algal pond containing algae and designed to remove nutrients from wastewater; (ii) an SRT for removing solids from wastewater and the SRT is capable of increasing level of dissolved oxygen in wastewater when solids are removed from wastewater; and (iii) a maturation pond for exposing wastewater to natural element of environment before discharging wastewater to environment. This system may further include a dissolved air flotation device that is connected to the algal pond at one end and is connected to the SRT at another end and the SRT is connected to the maturation pond.

In yet another aspect, the present invention provides an algal pond. The algal pond includes: (i) a tank having defined therein a serpentine path that is capable of holding wastewater and algae; (ii) algae for removing nutrients from wastewater; (iii) a radiation source disposed along the serpentine path for providing light to grow algae in the tank; (iv) a hydraulic pump; and (v) a paddle wheel, the hydraulic pump and the paddle wheel designed to aerate wastewater in the tank. The algal pond is preferably a high rate algal pond that has an inside surface area that is between about 1000 square feet and about 50,000 square feet. The length of channel is preferably between about 200 feet and about 3000 feet.

The construction and method of operation of the invention, however, together with additional objects and advantages thereof will be best understood from the following descriptions of specific embodiments when read in connection with the accompanying figures.

BRIEF DESCRIPTION OF THE DRAWINGS

FIG. 1 shows a system for wastewater treatment, according to one embodiment of the present invention.

FIG. 2 shows details of a biological chip reactor design, according to one embodiment of the present invention, used in the system of FIG. 1.

FIG. 3 shows an inventive algal pond used in the system of FIG. 1.

FIG. 4 shows a perspective view of the algal pond of FIG. 3.

DETAILED DESCRIPTION OF THE PREFERRED EMBODIMENTS

In the following description numerous specific details are set forth in order to provide a thorough understanding of the present invention. It will be apparent, however, to one skilled in the art that the present invention may be practiced without limitation to some or all of these specific details. In other instances, well known process steps have not been described in detail in order to not unnecessarily obscure the invention.

FIG. 1 shows a system design 100, according to one embodiment of the present invention, for active treatment of wastewater. System 100 includes a feed pond 102, which provides wastewater to a series of active devices for removal of solid waste. These active devices include a twin wire press ("TWP") 104, a dissolved air flotation ("DAF") tank 106 and a first sediment removal tank ("SRT") 108, each of which facilitates removal of solid contaminants of different sizes and type. The relatively-solid-free wastewater is then transported to a series of biological chip reactors ("BCR") 110 and 112 to remove organic matter. For removal of solid sludge, if necessary, an aerobic sludge digester tank 114 is provided. Wastewater containing dead microorganisms from either biological chip reactor 112 or from aerobic sludge digester 114, if one is employed, is sent to a second SRT 116 for removal of solids which include for the most part dead microorganisms. For further removal of dead organisms, the wastewater is treated in DAF tank 106 and from there sent to a high rate algal pond ("HRAP") 118. HRAP 118 is provided to remove nutrients, such as nitrates, nitrites and phosphorous, from the wastewater. Next, wastewater is passed again through DAF 106 and through a third SRT 120 to specifically remove algae introduced into wastewater from HRAP 118. DAF 106 also serves to increase level of dissolved oxygen in wastewater. The nutrient-and-algae-depleted wastewater is optionally provided to a maturation pond 122 before discharging to the environment. In maturation pond 122, residual algae not removed in DAF 106 and SRT 120 is removed and treated wastewater is exposed to elements of the natural environment.

System 100 also includes various lines or connections between the different tanks to transport residual solids that are removed from the wastewater. According to FIG. 1, one such line 124 is provided between DAF 106 and feed pond 102 to transport those solids which are not removed after treatment in DAF 106 back to feed pond 102. Another line 126 is provided to transport solids, which typically include dead microorganisms, from aerobic sludge digester 114 back to feed pond 102. According to the embodiment shown in FIG. 1, residual solids are not only transported from aerobic sludge digester 114, but are also transported to digester 114. Specifically, a line 128 is provided to transport residual solids from DAF 106 back to aerobic sludge digester 114.

TWP 104 comes equipped with a screen designed to remove solids that do not settle out in pond 102 or that are pulled into system 100 by the inlet pumps (not shown to simplify illustration of FIG. 1). Solids in wastewater that pass through the screen are pressed between at least two belts, each of which is supported by turning rollers positioned throughout the press. The belts are permeable and allow wastewater to pass through, holding back heavy solids. Moving action of the belt and the splashing of wastewater, as it permeates the belt, also serves to introduce oxygen into wastewater. The resulting increased level of dissolved oxygen encourages growth of microorganisms which remove organic matter in a subsequent step.

Depending on the screen size, TWP 104 removes between about 75% and about 98% of solids removed from wastewater, which at this stage of treatment typically has a solid content that is between about 15% and about 30%. Eliminating these solids represents a significant amount of BOD removal. Solids removed by the press may be composted or otherwise removed from the premises for disposal. TWP 104 can be made from any rigid material, but is preferably made from stainless steel. Similarly, a range of suitable dimensions work well. In one preferred embodiment of the present invention, system 100 uses a TWP commercially available from Press Technologies of Wheat Ridge, Colo.

DAF 106 captures small particulate matter that is not removed by TWP 104. To effect solid separation from wastewater, DAF, in accordance with one embodiment of the claimed invention, uses a pored diffuser and a high pressure pump that is preferably fitted with a venturi tube and is designed to introduce air bubbles inside wastewater. The pump draws in air, forcing air bubbles through the pored diffuser to form micro air bubbles. The pored diffuser may be made from stone. Air is forced through the pored diffuser to produce a diffused air flow, preferably of about 40 cubic feet per minute. Air bubbles in their upward motion accumulate on the particulate matter and carry with them particulate matter to the top, where they are removed via skimmers.

Air bubbles inside DAF provide a large surface area to effectively dissolve oxygen and thereby raise the level of soluble oxygen in wastewater. As a result, air bubbles not only facilitate removal of solids, but also increase the level of dissolved oxygen in wastewater to promote microorganism growth for subsequent removal of organic matter. Thus, the present invention promotes conditions for effective removal of organic matter in early stages and well before such removal is the primary focus during subsequent treatment.

In preferred embodiments of the present invention, DAF device is commercially available from Martint Environmental of Lexington, S.C. By way of example, a DAF device used in the present invention is about 7 feet long, 3.5 feet wide and 5 feet high. Hydraulic residence time in a DAF device may be between about 1 and about 3 hours. Hydraulic residence time refers to the amount of time it takes for a single molecule of water to pass through the unit from the time it enters a tank, for example, to the time it leaves. DAF device removes between about 85% and about 95% of the solids removed from wastewater, which at this point has a solid content that is between about 3% and about 6%.

Unlike conventional solid sedimentation in the prior art, the present invention does not require solids to fully settle to the bottom of the SRT to be trapped there. SRT 108 effects separation of residual solids by actively increasing the hydraulic flow path and providing physical impediments to particles for permanently trapping them. Hydraulic flow path refers to a path that is traversed by wastewater. An increase in the hydraulic flow path allows for separating a greater amount of solids from wastewater.

SRT 108 is preferably large enough such that it takes wastewater being pumped in at 40 gallons per minute 100 minutes to fill it. U.S. Pat. No. 6,899,808, which is incorporated herein by reference for all purposes, describes preferred embodiments of the SRT used in the present invention. Surface area inside SRT 108 is preferably between about 160 square feet and about 320 square feet. SRT removes between about 85% and about 90% of solids having particle sizes greater than 20 micrometers from wastewater, which at this point has a solid content of about 1%. During the solid removal process, SRT 108 effects diffused air flow to raise level of dissolved oxygen in wastewater and to clean the screens provided for solid removal. By reducing BOD level and solid content and raising level of dissolved oxygen in wastewater, the present invention promotes conditions for removal of organic matter in early stages and well before such removal is the primary focus during subsequent treatment.

FIG. 2 shows a cross-sectional view of a BCR 200 (e.g., BCRS 110 and 112), in accordance with one embodiment of the present invention. BCR 200 includes a tank 202, which contains biological chips 214 and has an inlet 208 for providing wastewater (not shown to simplify illustration) for treatment. Tank 202 is equipped with a blower 204 which introduces air inside wastewater. Waste solids in wastewater form a layer 212 and are removed by a pump 210. Biological chips 214 and blower 204 serve to provide wastewater with very high dissolved oxygen concentration and a high surface area to volume ratio to aide the metabolic growth rates of microorganisms (not shown in FIG. 2 to simplify illustration).

BCR is an aerobic treatment system that utilizes microorganisms attached to biologic chips to form a biological film or slime layer (typically ranging from 0.1 mm to 0.2 mm thick). Microorganisms in the outer part of slime layer degrade the organic material in wastewater. However, as the slime layer thickens, oxygen is unable to penetrate the biological chips and anaerobic organisms develop. Eventually the microorganisms near the surface lose their ability to cling to the biological chips, and a portion of the slime layer falls off.

In accordance with one embodiment of the present invention, microorganisms inside a BCR include aerobic, anaerobic and facultative bacteria, fungi, and protozoa. BCR 110 is preferably designed to contain many different types of microorganisms, each of which is ideally suited to remove at least one type of organic matter from wastewater. By way of example, BCR 110 uses heterotrophic bacteria (e.g., *Achromobacter, Alcaligenes, Arthrobacter, Cirtomonas, Flavobacterium, Pseudomonas* and *Zoogloea*) for removal of BOD. BOD refers to any matter containing a carbon molecule normally present in wastewater generated from and includes human waste, food waste, animal waste and plant waste.

Blower 204 is effective in providing oxygen to microorganisms in wastewater. Size of bubbles formed in wastewater from pumping air and the amount of air pumped dictate the amount of oxygen dissolved in wastewater. Those skilled in the art will recognize that small bubbles can be twice as efficient at transferring oxygen because they provide greater surface area of air per mass of air. Bubbles also mix wastewater inside the BCR to ensure that nutrients in wastewater are in constant contact with the bacteria that consumes them.

The presence of biological chips provides a high surface area inside the reactor for the microorganisms to affix to. By way of example, the ratio of surface area inside the BCR to volume of BCR is between about 32 square feet per cubic foot and about 130 square feet per cubic foot. Preferably, however, the ratio of surface area inside the BCR to volume of BCR is about 73.5 square feet per cubic feet. High surface area combined with high oxygen concentration aide the metabolic rates of microorganisms. The affixed microorganisms quickly remove all available food in the form of organic particulate matter (BOD) from the reactor and leave a situation of high metabolic rates and low amounts of food (i.e., there is a low ratio of food to microorganism). Over a period of time, most solids in the reactors continue to be active and remove more BOD from the influent water. Eventually, as more and more of the food is depleted inside the reactor, the microorganisms die from starvation.

BCR 112 is preferably designed to contain at least one type of microorganism which removes at least one organic matter that is particularly difficult to remove from the wastewater in BCR 110 or requires additional processing time, i.e., above and beyond the processing time in BCR 110. According to the present invention, it is also possible to have additional BCRs, in addition to BCRs 110 and 112, to facilitate effective organic matter removal. By way of example, an initial step of nitrification is carried out in BCR 112 by autotropic bacteria *Nitrosomonas*, which converts ammonia to nitrite, despite the fact that some nitrifying bacteria exists in BCR 110. A third BCR (not shown in FIG. 1 to simplify illustration) may be used for a subsequent step of nitrification using autotropic bacteria *Nitrobacter*.

In preferred embodiments of the present invention, BCRs 110 and 112 are about 7 feet long, 10.5 feet wide and 8 inches in height. Temperature inside BCRs are preferably between about 60° F. and about 90° F., and the hydraulic residence time is preferably about 8 hours. According to one embodiment of the present invention, BCRs are about 40% filled with small biorings, have 133 cubic feet per minute of diffused air flowing through it during operation and uses 6 ounces of defoaming agent per day. In cold climates, where heat dissipation is relatively high, it is preferable to keep substrate levels high to carry out nitrification effectively. The term "high substrate levels" means keeping a certain level of biological matter (sludge) inside the BCR to maintain its thermal mass and avoid wide temperature swings inside the BCR and/or also means keeping the bacteria count high to accommodate the greater die off rate when temperatures drop.

The present invention's use of a BCR, individually or in combination with other BCR, represents an active process because it is provides air and constantly places bacteria in contact with nutrients through circulation of wastewater to effectively encourage nutrient uptake. Furthermore, the surface area inside the BCR is also optimized for removal of organic waste.

Aerobic sludge digester 114 is one type of BCR, except that it is designed to remove sludge. In other words, digester 114 contains microorganisms which are known to consume and, therefore, remove sludge.

Although the BCRs and aerobic sludge digesters remove organic matter and lower the BOD, they leave a wastewater rich with nitrates from the endogenous decay of microorganisms that have run out of food source. To this end, previously described DAF 106 and a second SRT, shown as SRT 116 in FIG. 1, are used to remove dead microorganisms. To remove dead microorganisms, DAF 106 is provided with another chamber, separate from the chamber which is used to remove from wastewater solids that are not dead microorganisms. HRAP 118 is used in system 100 to remove nutrients from wastewater.

FIG. 3 shows HRAP 300, according to one preferred embodiment of the present invention. HRAP 300 includes a tank 302 containing algae 308. A spectrum of radiation 306 operates at wavelengths that range from about $10^2$ nm and $10^6$ nm. This spectrum of radiation is preferably disposed at a location that is between about ⅓ and about ½ the depth of HRAP 300. At the bottom of tank 302, a solid waste layer 304 accumulates which may ultimately be removed. A hydraulic pump and a paddle (both not shown to simplify illustration) are preferably provided in HRAP 300 for stirring and aeration of wastewater. Aeration and stirring facilitates driving up the dissolved oxygen level in wastewater to promote algae growth. Tank 302 is preferably maintained at a temperature that is between about 70° F. and 95° F.

FIG. 4 shows a perspective view of HRAP 300, in accordance with one preferred embodiment of the present invention. Inside HRAP 300 wastewater is preferably guided through a channel, which allows the water to traverse back and forth along a length of tank 302. The channel carves out a hydraulic path for wastewater and is preferably serpentine in shape.

HRAP can have any dimensions that effectively remove nutrients from wastewater. The present invention recognizes, however, that nutrient load and flowrate of wastewater drive HRAP dimensions. By way of example, HRAP has a length of about 24 feet, a width of about 77 feet and a height of about 4 feet. HRAP preferably provides a surface area that is between about 1000 square feet and about 50,000 square feet and, more preferably, about 1848 square feet for wastewater treatment. The channel length is preferably between about 200 feet and about 3000 feet. Inside the channel of HRAP, wastewater moves at a velocity of 10 inches per second and has a residence time of about 72 hours.

HRAP primarily uses algae to remove nitrates and phosphates from wastewater. Growth rate of algae is dictated by available oxygen, temperature, light and nutrients. Conventional HRAPs are very shallow because they facilitate introduction of oxygen and penetration of light to promote algae growth. Unfortunately, for processing relatively large volumes of wastewater, conventional HRAPs are very large, significant real estate, i.e., typically measured in hectares.

The present invention preferably uses a high-rate algal pond which is deeper and not so spread out. In preferred embodiments of the present invention, it both aerates and stirs wastewater to effectively introduce oxygen. Furthermore, a radiation source inside the HRAP effectively facilitates light to penetrate through to greater depths of wastewater. As a result, HRAPs according to the present invention can occupy as little as 160 square meters for 120 m$^3$ per day flow systems.

At a minimum, conventional wastewater treatment processes fail to recognize that: (i) decomposition of organic matter depletes soluble oxygen in wastewater constantly during various treatment steps; (ii) need to substantially maintain the level of dissolved oxygen in wastewater at various stages is important for effective treatment; and (iii) failure to substantially maintain level of dissolved oxygen and lower solid content through each stage of wastewater treatment causes a reversible reaction which reverses the treatment accomplished in previous treatment steps.

To this end, various steps in preferred embodiments of the present invention recognize the need to drive down BOD, solid content and nutrient level and maintain or increase level of dissolved oxygen in wastewater. In preferred embodiments of the present invention, wastewater undergoes different types of treatment. By way of example, BOD creating solids are removed first. Then, the organic matter is consumed by bacteria. Next, nutrients present in wastewater are removed. After performing a first type of treatment, however, the present invention recognizes the need to stabilize the wastewater before advancing it to a second type of treatment. Stabilizing involves preventing a meaningful change in certain important properties of wastewater, e.g., BOD level, dissolved oxygen level, solid content level and nutrient level, which are susceptible to changing to undesired values by a reversible reaction. Specifically, by lowering BOD levels and solid content and increasing or substantially maintaining dissolved oxygen levels in wastewater throughout the various stages, the present invention effectively transitions from one treatment type to another, without suffering from drawbacks of a reversible reaction.

In accordance with one embodiment, the inventive process using system 100 of FIG. 1 may begin when a treatment system 100 receives wastewater for treatment directly from a feed pond (e.g., feed pond 102 of FIG. 1). In the feed pond, the wastewater is treated with diffused air flow to maintain a level of dissolved oxygen in wastewater. The wastewater is then immediately advanced for solid removal as one type of treatment. In a preferred embodiment of the present invention, solid removal is carried out methodically in different steps. It is noteworthy that in this embodiment, not only are solids removed at different steps, but the inventive process is designed to substantially maintain the level of dissolved oxygen in wastewater during these steps to avoid a reversible reaction.

Solid removal preferably begins with removal of relatively large solids from wastewater using a mechanical technique. By way of example, a twin wire press such as the one shown in FIG. 1 is preferably used for pressing wastewater containing solids because it also introduces air into the wastewater during the pressing action. As a result, pressing not only removes large solids from wastewater but also maintains the level of dissolved oxygen in wastewater. At this early stage of solid removal, an aerobic process ensures a natural biological degradation and purification process in which bacteria that thrive in oxygen-rich environment break down and digest the organic matter. Maintaining oxygen levels during solid removal ensures that such bacteria do not die off and that level of BOD contributing solids and solid content in wastewater does not increase. Undesired increase in BOD contributing solids at this stage would defeat the ultimate purpose of removing the BOD contributing solids in this step. In other words, during a single treatment step, lowering solid content, lowering BOD level and substantially maintaining or increasing level of dissolved oxygen in wastewater prevents a reversible reaction that increases BOD, solid content and/or lowers level of dissolved oxygen in wastewater.

After removing large solids, preferred embodiments of the present invention focus on the removal of medium-sized particles using small air bubbles. In this treatment step, medium-sized solids are carried by an upward motion of air bubbles and removed as explained previously. As a result, bubbles remove BOD contributing solids, lower solid content and introduce oxygen simultaneously to substantially maintain or increase a level of dissolved oxygen in wastewater. The advantages of lowering BOD and solid content and at the same time, substantially maintaining or increasing a level of dissolved oxygen in wastewater realized in the previous step are also realized in this step.

For removal of finer solids from wastewater, the inventive process in a preferred embodiment moves to a tank, such as SRT 108 as shown in FIG. 1. This tank also stabilizes the wastewater before removal of organic matter commences. Specifically, the tank is designed to remove fine solid particles using a screen when diffused air flow is used inside the tank. Such air flow provides cleaning action to remove the solid build up on the screen and introduces oxygen into wastewater. The advantages of lowering BOD and solid content in wastewater and at the same time, substantially maintaining or increasing level of dissolved oxygen in wastewater realized in the previous steps are also realized in this step.

Next, the inventive process preferably moves to removal of organic matter as another type of treatment. In this stage of treatment, preferably in a biological chip reactor, such as the one shown in FIG. 1, microorganisms in the presence of biological chips consume organic matter. This consumption is enhanced by the presence of a blower which introduces oxygen into wastewater, increasing level of dissolved oxygen in wastewater. With removal of organic matter, wastewater has lower BOD level and solid content and increased level of dissolved oxygen. Microorganisms after consuming a substantial amount of organic material, however, die off and increase both BOD level and solid content. If the dead microorganisms are not timely removed, level of dissolved oxygen in wastewater will drop and a reversible reaction will increase BOD level and solid content in wastewater.

As a result, in the next treatment step, the present invention offers provisions to remove dead microorganisms from wastewater. To this end, preferably first anaerobic treatment and then an aerobic treatment is used. In the anaerobic treatment, preferably a SRT is sealed off to make sure that all aerobic microorganisms die off. At the same time, using screens inside the SRT, dead microorganisms are removed. This lowers both BOD level and solid content in wastewater. But, before wastewater can advance to the next stage, the present invention realizes that level of dissolved oxygen in wastewater should increase.

In the next step, aerobic treatment is preferably carried out using a DAF tank such as the one shown in FIG. 1. Diffused air flow inside the DAF tank raises level of dissolved oxygen and removes residual solids. Now, wastewater having lower BOD level and solid content and higher level of dissolved oxygen is ready for the next stage of treatment.

In the next stage, wastewater is treated in algal pond, preferably in an HRAP such as the one shown in FIG. 1, to effectively remove nutrients from wastewater. Nutrient removal from wastewater is carried out by algae which in the presence of an operating radiation source consumes nutrients. Algae also boost level of dissolved oxygen in wastewater. However, level of dissolved oxygen in wastewater may not be high enough to meet the requirement of discharge to environment.

It is noteworthy that if after anaerobic treatment aerobic treatment did not follow, then wastewater with low level of dissolved oxygen would have entered the HRAP posing a risk of killing algae in an oxygen depleted environment. Thus, anaerobic treatment followed by aerobic treatment ensures that wastewater is prepared for nutrient removal in the subsequent steps.

In the next treatment steps, level of dissolved oxygen in wastewater is raised to allow discharge to environment. Preferably a DAF is used to provide diffused air flow for raising level of dissolved oxygen and removing algae and other solids from wastewater. Solid removal lowers BOD level and solid content in wastewater. Then, for removal of finer particles, wastewater is advanced to an SRT which uses diffused air for removal of solids from and to introduce oxygen in wastewater. Consequently, wastewater has the requisite high level of dissolved oxygen, lower BOD level and solid content for discharge into environment.

Although wastewater is now ready for discharge into environment, preferred embodiments treat this wastewater in a maturation pond where it is exposed to elements found in the environment. Wastewater matures and is adapted to the natural environment in the maturation pond, from where it is discharged to the environment.

Although illustrative embodiments of this invention have been shown and described, other modifications, changes, and substitutions are intended. Accordingly, it is appropriate that the appended claims be construed broadly and in a manner consistent with the scope of the disclosure, as set forth in the following claims.

What is claimed is:

1. A method of wastewater treatment, comprising:
   receiving wastewater;
   performing a first type of treatment on wastewater to produce wastewater having a first property which is capable of changing, and wherein said first property includes at least one property selected from a group consisting of biochemical oxygen demand ("BOD") level, dissolved oxygen level, solid content and nutrient level;
   preventing said first property from changing, and wherein said preventing includes:
   (i) treating wastewater under anaerobic conditions to produce wastewater with low biochemical oxygen demand ("BOD") and wherein anaerobic conditions are created by removing dead microorganisms from wastewater in a tank that is sealed to maintain dissolved oxygen in wastewater at a substantially constant level; and
   (ii) treating wastewater with low BOD under aerobic conditions; and
   performing a second type of treatment on wastewater.

2. The method of claim 1, wherein said receiving includes receiving wastewater in a feed pond that is capable of maintaining dissolved oxygen at a substantially constant level using diffused air flow when solids are removed from wastewater.

3. The method of claim 1, wherein said first type of treatment includes removal of solids and said second type of treatment includes removal of organic matter.

4. The method of claim 3, wherein said removal of solids includes:
   mechanically separating solids from wastewater to remove a first amount of solids from wastewater; and
   using a dissolved air flotation device to remove a second amount of solids from wastewater.

5. The method of claim 4, wherein said receiving includes receiving wastewater in a feed pond and said mechanically separating includes separating solids from wastewater which is obtained directly from said feed pond.

6. The method of claim 4, wherein said first amount of solids represents between about 75% and about 98% of solids removed from wastewater having a solid content that is between about 15% and about 30%.

7. The method of claim 4, wherein said second amount of solids represents between about 85% and about 95% of solids removed from wastewater having a solid content that is between about 3% and about 6%.

8. The method of claim 3, wherein said preventing includes removing solids from wastewater in a tank that uses diffused air flow to maintain dissolved oxygen in wastewater at a substantially constant level.

9. The method of claim 8, wherein removing solids include removing between about 85% and about 90% of solids having particle sizes greater than 20 micrometers from wastewater having a solid content of about 1%.

10. The method of claim 1, wherein said first type of treatment includes removing organic matter from wastewater and said second type of treatment includes removing nutrients from wastewater.

11. The method of claim 10, wherein removing organic matter includes exposing microorganisms in wastewater to oxygen in the presence of biological chips.

12. The method of claim 11, wherein microorganisms are exposed to oxygen in a surface area to volume ratio that is between about 32 square feet per cubic foot and about 130 square feet per cubic foot.

13. The method of claim 10, wherein said removal of nutrients includes treating wastewater in an algal pond in the presence of a spectrum of radiation having wavelengths ranging from about $10^2$ nm to about $10^6$ nm.

14. The method of claim 13, wherein treating wastewater in an algal pond includes aerating wastewater.

15. The method of claim 13, wherein said algal pond is a high rate algal pond providing a surface area that is between about 1000 square feet and about 50,000 square feet for wastewater treatment.

16. The method of claim 15, wherein said high rate algal pond is maintained at a temperature that is between about 70° F. and about 95° F.

17. The method of claim 15, wherein said high rate algal pond has a channel length that is between about 200 feet and about 3000 feet.

18. The method of claim 1, wherein aerobic conditions include:
   removing dead microorganisms from wastewater; and
   contemporaneously increasing level of dissolved oxygen in wastewater.

19. The method of claim 1, wherein said first type of treatment includes removing nutrients from wastewater and said second type of treatment includes exposing wastewater to elements of nature.

20. The method of claim 19, wherein said preventing further includes:
   removing algae from wastewater; and
   contemporaneously increasing level of dissolved oxygen in wastewater.

21. The method of claim 20, wherein said preventing further includes removing algae from wastewater in a tank using diffused air flow which maintains dissolved oxygen in wastewater at a substantially constant level.

22. A system of wastewater treatment, comprising:
 means for receiving wastewater;
 means for performing a first type of treatment on said wastewater to produce wastewater having a first property which is capable of changing, and wherein said first property includes at least one property selected from a group consisting of biochemical oxygen demand ("BOD") level, dissolved oxygen level, solid content and nutrient level;
 means for preventing said first property from changing and wherein said means for preventing includes:
 (i) means for treating wastewater under anaerobic conditions to produce wastewater with low biochemical oxygen demand ("BOD") and wherein anaerobic conditions are created by removing dead microorganisms from wastewater in a tank that is sealed to maintain dissolved oxygen in wastewater at a substantially constant level; and
 (ii) means for treating wastewater with low BOD under aerobic conditions; and
 means for performing a second type of treatment on said wastewater.

23. A system for wastewater treatment, comprising:
 a tank for removing solids from wastewater;
 a first sedimentation removal tank ("SRT") designed to remove solids from wastewater using diffused air flow which maintains dissolved oxygen in wastewater at a substantially constant level and said first SRT produces a larger hydraulic flow path than a tank that does not use diffused air flow to remove solids from wastewater; and
 a reactor containing biological chips and microorganisms to remove organic matter present in water.

24. The system of claim 23, wherein said tank is a twin wire press or a feed pond.

25. The system of claim 23, further comprising a dissolved air flotation ("DAF") device that includes:
 a pored diffuser; and
 a high pressure water pump fitted with a venture tube for drawing in air, forming air bubbles and forcing said air bubbles through said pore diffuser to form micro air bubbles.

26. The system of claim 25, further comprising a connection between said DAF and said feed to provide residual solids from said DAF to said feed pond.

27. The system of claim 25, further comprising an aerobic sludge digester and a connection between said aerobic sludge digester and said DAF to provide residual solids from said DAF to said aerobic sludge digester.

28. The system of claim 23, wherein said reactor includes a blower to facilitate introduction of oxygen into wastewater.

29. The system of claim 23, wherein said reactor has a surface area of between about 70 square feet and about 210 square feet.

30. The system of claim 23, wherein said reactor is a rotating biological contractors or a packed bed reactor.

31. The system of claim 23, further comprising;
 a second SRT for removing dead microorganisms from wastewater and said second SRT capable of being sealed to maintain dissolved oxygen in wastewater at substantially constant level when dead microorganisms are removed from wastewater; and
 an algal pond capable of removing nutrients from wastewater in presence of algae.

32. The system of claim 31, further comprising a dissolved air flotation ("DAF") device that is connected to said second SRT at one end and is connected to said algal pond at another end and said DAF device is capable of increasing level of dissolved oxygen in wastewater when removing dead microorganisms from wastewater.

33. The system of claim 31, wherein said algal pond operates at a temperature that is between about 65° F. and about 95° F.

34. The system of claim 31, wherein said algal pond is equipped with a spectrum radiation source which operates to provide wavelengths in a range from about $10^2$ nm to about $10^6$ nm.

35. The system of claim 31, wherein said source is located at a distance that is between about ½ and about ⅓ of a depth of said pond.

36. The system of claim 31, wherein said algal pond includes a hydraulic pump and a paddle wheel designed for mixing wastewater.

37. The system of claim 31, wherein said algal pond is a high rate algal pond.

38. The system of claim 31, further comprising a third SRT designed to remove algae introduced from said algal pond.

39. The system of claim 38, further comprising a maturation pond being designed to expose wastewater to natural elements of environment before discharge to environment, said maturation pond connected to said third SRT.

40. The system of claim 38, wherein further comprising a dissolved air flotation device which is connected to said third SRT at one end and connected to said algal pond at another end.

41. The system of claim 31, further comprising a feed pond for directly feeding wastewater to said tank.

42. A system for wastewater treatment, comprising:
 a reactor containing biological chips and microorganisms to remove organic matter from wastewater;
 a sedimentation removal tank ("SRT") for removing solids from wastewater and said SRT capable of being sealed to maintain dissolved oxygen in wastewater at substantially constant level when solids are removed from wastewater and said SRT produces a larger hydraulic flow path than a tank that does not use diffused air flow to remove solids from wastewater; and
 an algal pond containing algae and designed to removing nutrients from wastewater.

43. The system of claim 42, further comprising a dissolved air flotation ("DAF") device that is connected to said SRT at one end and connected to said algal pond at another end.

44. A system for wastewater treatment, comprising:
 an algal pond containing algae and designed to remove nutrients from wastewater;
 a sedimentation removal tank ("SRT") for removing solids from wastewater using diffused air flow which maintains level of dissolved oxygen in wastewater at substantially constant level and said SRT produces a larger hydraulic flow path than a tank that does not use diffused air flow to remove solids from wastewater; and
 a maturation pond for exposing wastewater to natural element of environment before discharging wastewater to environment.

45. The system of claim 44, further comprising a dissolved air flotation device that is connected to said algal pond at one end and is connected to said SRT at another end and said SRT is connected to said maturation pond.

46. An algal tank assembly, comprising:
 a tank having defined therein a serpentine path that is capable of holding wastewater and algae;

algae for removing nutrients from wastewater;
a radiation source disposed along said serpentine path for providing light to grow algae in said tank;
a hydraulic pump; and
a paddle wheel, said hydraulic pump and said paddle wheel designed to aerate wastewater in said tank.

47. The algal tank of claim 46, wherein said algal tank is a high rate algal pond that has an inside surface area that is between about 1000 square feet and about 50,000 square feet.

48. The algal tank of claim 46, wherein said length of channel is between about 200 feet and about 3000 feet.

* * * * *